(12) United States Patent
Yousif

(10) Patent No.: US 12,190,607 B2
(45) Date of Patent: Jan. 7, 2025

(54) SYSTEM AND METHOD FOR SIMULTANEOUS ONLINE LIDAR INTENSITY CALIBRATION AND ROAD MARKING CHANGE DETECTION

(71) Applicant: FORD GLOBAL TECHNOLOGIES, LLC, Dearborn, MI (US)

(72) Inventor: Khalid Yousif, Milpitas, CA (US)

(73) Assignee: Ford Global Technologies, LLC

( * ) Notice: Subject to any disclaimer, the term of this patent is extended or adjusted under 35 U.S.C. 154(b) by 405 days.

(21) Appl. No.: 17/507,182

(22) Filed: Oct. 21, 2021

(65) Prior Publication Data

US 2023/0126833 A1 Apr. 27, 2023

(51) Int. Cl.
*G06K 9/00* (2022.01)
*G01S 7/497* (2006.01)
*G01S 17/89* (2020.01)
*G05D 1/00* (2006.01)
*G06V 20/56* (2022.01)

(52) U.S. Cl.
CPC ............ *G06V 20/588* (2022.01); *G01S 7/497* (2013.01); *G01S 17/89* (2013.01); *G05D 1/0274* (2013.01)

(58) Field of Classification Search
CPC .................................................... G06V 20/588
See application file for complete search history.

(56) References Cited

U.S. PATENT DOCUMENTS

| | | | |
|---|---|---|---|
| 9,395,192 B1 * | 7/2016 | Silver | G01S 13/865 |
| 9,530,062 B2 | 12/2016 | Nguyen et al. | |
| 10,657,390 B2 | 5/2020 | Mei et al. | |
| 2010/0100268 A1 * | 4/2010 | Zhang | G06V 20/582 701/25 |
| 2016/0209846 A1 * | 7/2016 | Eustice | G05D 1/0274 |
| 2019/0391268 A1 * | 12/2019 | Houts | G05D 1/0088 |
| 2020/0160559 A1 * | 5/2020 | Urtasun | G06T 7/246 |
| 2020/0175720 A1 * | 6/2020 | Hsu | H04N 13/156 |
| 2020/0226790 A1 * | 7/2020 | Alvarez | G01S 13/865 |

(Continued)

FOREIGN PATENT DOCUMENTS

KR 20210089172 A 7/2021

OTHER PUBLICATIONS

Extended European Search Report of European application No. 22202559.5 dated Mar. 7, 2023, 10 pages.

(Continued)

*Primary Examiner* — Hadi Akhavannik
(74) *Attorney, Agent, or Firm* — Frank A. MacKenzie; Brooks Kushman P.C.

(57) ABSTRACT

A system, method, and computer program for updating calibration lookup tables within an autonomous vehicle or transmitting roadway marking changes between online and offline mapping files is disclosed. A LIDAR sensor may be used for generating an online (rasterized) mapping file with online intensity values which are compared against a correlated offline (rasterized) mapping file having offline intensity values. The online intensity value may be used to acquire a lookup table having a normal distribution that is compared against the offline intensity value. The lookup table may be updated when the offline intensity value is within the normal distribution. Or the vehicle may transmit a roadway marking change when the offline intensity value is outside the normal distribution.

16 Claims, 8 Drawing Sheets

(56) References Cited

U.S. PATENT DOCUMENTS

| | | | |
|---|---|---|---|
| 2020/0340817 A1* | 10/2020 | Schomerus | G01C 21/32 |
| 2021/0063199 A1 | 3/2021 | Akbarzadeh et al. | |
| 2021/0097308 A1 | 4/2021 | Kumar et al. | |
| 2021/0172756 A1 | 6/2021 | Wheeler et al. | |
| 2023/0126833 A1* | 4/2023 | Yousif | G01S 17/89 |
| | | | 382/104 |

OTHER PUBLICATIONS

Jeong et al., "Lidar Intensity Calibration for Road Marking Extraction", 15th International Conference on Ubiquitous Robots (UR), 2018, 6 pages.

* cited by examiner

SYSTEM AND METHOD FOR SIMULTANEOUS ONLINE LIDAR INTENSITY CALIBRATION AND ROAD MARKING CHANGE DETECTION

BACKGROUND

LIDAR systems may be used for various purposes. When employed within an autonomous vehicle, LIDAR systems are typically used to detect objects and to provide range determinations. LIDAR systems within an autonomous vehicle may include one or more transmitters/emitter devices and more receivers/detectors may be housed in a rotating portion of the LIDAR system, such that a laser beam may be emitted and the return beam may be detected in various directions around the LIDAR system as the rotating portion of the LIDAR system rotates.

The intensity of the LIDAR system (which may be a measure of the return strength of the laser beam) may be used as part of various autonomous driving technologies (e.g. localization, mapping and road marking detection). An advantage of employing LIDAR intensity in comparison to alternative sensor systems (e.g., vision sensors) is that LIDAR systems are generally invariant to lighting conditions and shadows. However, LIDAR intensity values may be affected by other factors, such as the angle of incident, range, surface composition, and moisture. These factors may lead to inconsistent results from the LIDAR system and a calibration step may be employed.

SUMMARY

A system, method, and non-transitory computer-readable medium for calibrating data used by a sensor system within an autonomous vehicle. An online mapping file (e.g., a rasterized data file which may be gray-scale or color) may be received and include a plurality of online intensity values. The online mapping file may be generated from a first set of data acquired by a LIDAR sensor coupled to the autonomous vehicle. The online mapping file may also be generated based on a path being driven by the autonomous vehicle. An offline mapping file may be received and include a plurality of offline intensity values corresponding to the path being driven by the autonomous vehicle. It is contemplated the offline mapping file may be received from a remote computing device via a wireless or wired connection. The offline mapping file may be generated using a second set of data acquired from at least a second remote LIDAR sensor. One lookup table may be received and be representative of at least one of the plurality of online intensity values. The one lookup table may be a normal distribution that includes the at least one of the plurality of offline intensity values corresponding to at least one of the plurality of online intensity values. Also, the normal distribution may be updated for the at least one lookup table when at least one of the plurality of offline intensity values is within the normal distribution.

An online roadway marking may also be detected along the path being driven by the autonomous vehicle using the online mapping file. The online roadway marking may be detected when at least one of the plurality of online intensity values exceeds a predetermined threshold. Operation of the autonomous vehicle may be controlled based on the online roadway markings. The plurality of offline intensity values may include an offline roadway marking representative of the path being driven by the autonomous vehicle. One of the plurality of offline intensity values representative of the offline roadway marking may also be different than the at least one of the plurality of online intensity values representative of the online roadway marking. Also, the online roadway marking may be different than the offline roadway marking when the at least one of the plurality of offline intensity values is outside the normal distribution.

BRIEF DESCRIPTION OF THE DRAWINGS

The accompanying drawings are incorporated herein and form a part of the specification.

DETAILED DESCRIPTION

Figure 1:
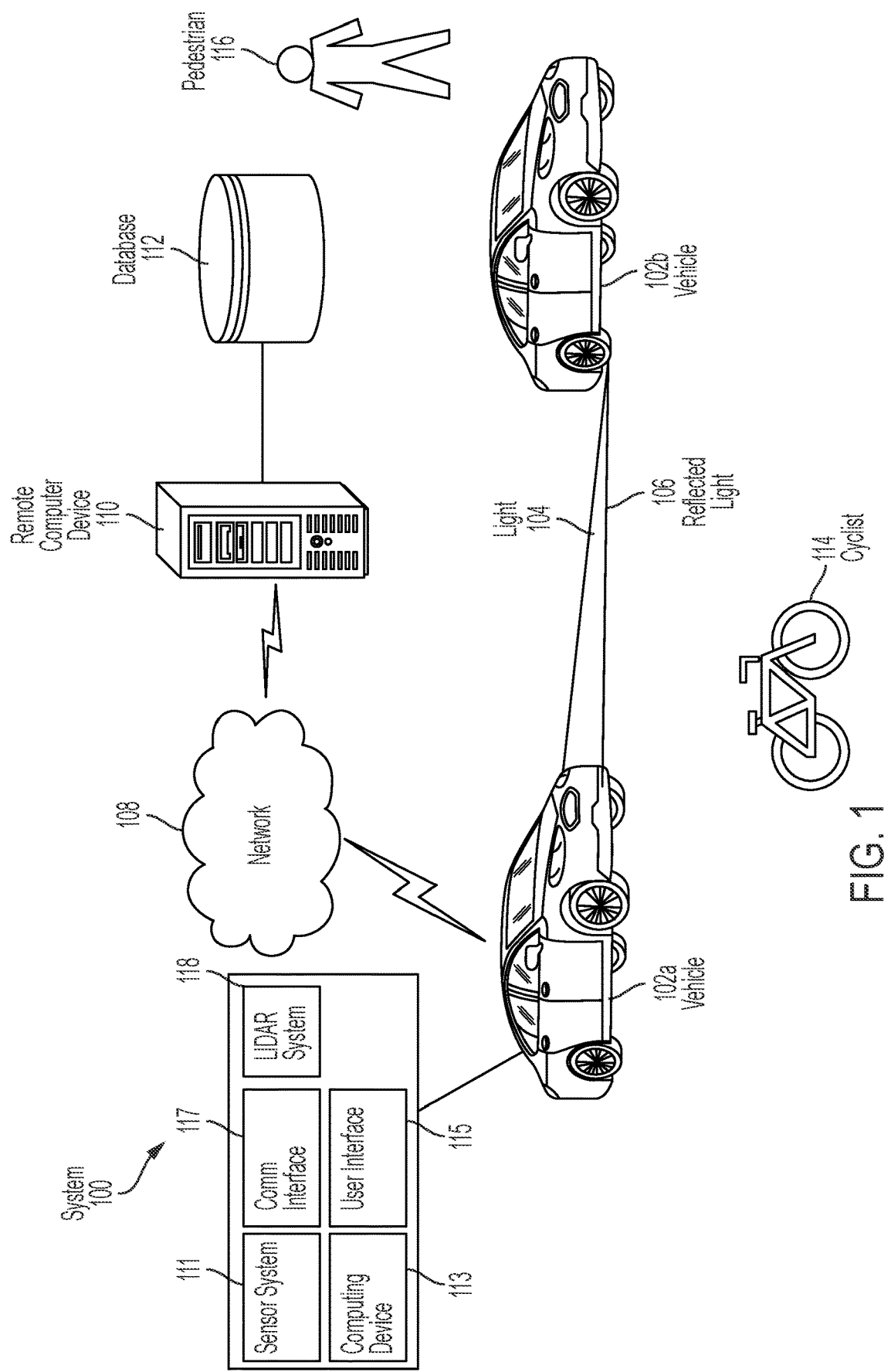
FIG. 1 illustrates an exemplary autonomous vehicle system, in accordance with aspects of the disclosure.

The intensity of the LIDAR system (which may be a measure of the return strength of the laser beam) may be used as part of various autonomous driving technologies (e.g. localization, mapping and road marking detection). An advantage of employing LIDAR intensity in comparison to alternative sensor systems (e.g., vision sensors) is that LIDAR systems are generally invariant to lighting conditions and shadows. However, LIDAR intensity values may be affected by other factors, such as the angle of incident, range, surface composition, and moisture. These factors may lead to inconsistent results from the LIDAR system and a calibration step may be employed.

It is therefore contemplated to detect road marking changes, a road surface intensity map that may be built offline (i.e., on a computing device remote from a vehicle) and compared with a map that may be built online (i.e., on a computing device located within a vehicle). The result from the comparison may be used to detect changes in road marking intensities which may infer new or degraded road markings. Differences between the two maps may occur because the offline map may be built under varying conditions, such as using a different sensor model, angle of incident, range, surface composition, and/or moisture. The variance between the offline and online mapping makes directly comparing the two signals challenging.

To help with the variance between the offline and online maps an offline sensor calibration procedure for each LIDAR sensor may be performed. However, the offline LIDAR calibration may also be time consuming as it requires collection of lidar intensity data that may need to be processed offline using powerful computing devices and substantial memory consumption. The amount of data that is processed offline becomes even more challenging for large-scale autonomous vehicle operation and managing a large fleet of vehicles that have different sensor models and attributes. Even if an offline calibration procedure is performed, this calibration may also need to be performed per sensor, and there may be no assurance that LIDAR intensities from two different LIDAR models can be directly compared after calibration.

The present disclosure therefore contemplates a system, apparatus, device, method and/or computer program product embodiments, and/or combinations and sub-combinations thereof, for simultaneous online LIDAR intensity calibration and road marking change detection. It is also contemplated an offline calibration procedure may not be required and prior knowledge of the varying sensor model characteristics and attributes may also not be required. Instead, the intensities from one modality may be cross-calibrated to the other.

As used within this disclosure, the term "vehicle" may refer to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (or "AV") is a vehicle having a processor, programming instructions and drivetrain components that are controllable by the processor without requiring a human operator. An autonomous vehicle may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

FIG. 1 illustrates an exemplary autonomous vehicle system 100, in accordance with aspects of the disclosure. System 100 comprises a vehicle 102a that may be traveling along a road in a semi-autonomous or autonomous manner. Vehicle 102a may also referred to herein as AV 102a. AV 102a may be configured to detect objects 102b, 114, 116 in proximity thereto. The objects can include, but are not limited to, a vehicle 102b, cyclist 114 (such as a rider of a bicycle, electric scooter, motorcycle, or the like) and/or a pedestrian 116.

As illustrated in FIG. 1, the AV 102a may include a sensor system 111, an on-board computing device 113, a communications interface 117, and a user interface 115. Autonomous vehicle 101 may further include certain components (as illustrated, for example, in FIG. 2) included in vehicles, which may be controlled by the on-board computing device 113 using a variety of communication signals and/or commands, such as, for example, acceleration signals or commands, deceleration signals or commands, steering signals or commands, braking signals or commands, etc.

The sensor system 111 may include one or more sensors that are coupled to and/or are included within the AV 102a. For example, such sensors may include, without limitation, a LiDAR system 118, a radio detection and ranging (RADAR) system, a laser detection and ranging (LADAR) system, a sound navigation and ranging (SONAR) system, one or more cameras (e.g., visible spectrum cameras, infrared cameras, etc.), temperature sensors, position sensors (e.g., global positioning system (GPS), etc.), location sensors, fuel sensors, motion sensors (e.g., inertial measurement units (IMU), etc.), humidity sensors, occupancy sensors, or the like. The sensor data can include information that describes the location of objects within the surrounding environment of the AV 102a, information about the environment itself, information about the motion of the AV 102a, information about a route of the vehicle, or the like. As AV 102a travels over a surface, at least some of the sensors may collect data pertaining to the surface LIDAR system 118 may be configured to transmit one or more light pulses 104 (e.g., laser beam) to detect objects located within a distance or range of distances of AV 102a. Light pulse 104 may be incident on one or more objects (e.g., AV 102b) and may be reflected back to the LIDAR system 118. Reflected light pulse 106 incident on the LIDAR system 118 may be processed to determine a distance of that object to AV 102a. The reflected light pulse may be detected using, in some embodiments, a photodetector or array of photodetectors positioned and configured to receive the light reflected back into the LIDAR system 118. Lidar information, such as detected object data, is communicated from the LIDAR system 118 to an on-board computing device 113. The on-board computing device 113 may be implemented using, for example, the computing system 800 of FIG. 8. The AV 102a may also communicate lidar data to a remote computing device 110 (e.g., cloud processing system) over communications network 108. Remote computing device 110 may be configured with one or more servers to process one or more processes of the technology described herein. Remote computing device 110 may also be configured to communicate data/instructions to/from AV 102a over network 108, to/from server(s) and/or database(s) 112.

Network 108 may include one or more wired or wireless networks. For example, the network 108 may include a cellular network (e.g., a long-term evolution (LTE) network, a code division multiple access (CDMA) network, a 3G network, a 4G network, a 5G network, another type of next generation network, etc.). The network may also include a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or the like, and/or a combination of these or other types of networks.

AV 102a may retrieve, receive, display, and edit information generated from a local application or delivered via network 108 from database 112. Database 112 may be configured to store and supply raw data, indexed data, structured data, map data, program instructions or other configurations as is known.

The communications interface 117 may be configured to allow communication between AV 102a and external systems, such as, for example, external devices, sensors, other vehicles, servers, data stores, databases etc. The communications interface 117 may utilize any now or hereafter known protocols, protection schemes, encodings, formats, packaging, etc. such as, without limitation, Wi-Fi, an infrared link, Bluetooth, etc. The user interface system 115 may be part of peripheral devices implemented within the AV 102a including, for example, a keyboard, a touch screen display device, a microphone, and a speaker, etc.

In various embodiments, the on-board computing device 113 may determine perception information of the surrounding environment of the AV 102a. Based on the sensor data provided by one or more sensors and location information that is obtained, the on-board computing device 113 may determine perception information of the surrounding environment of the AV 102a. The perception information may represent what an ordinary driver would perceive in the surrounding environment of a vehicle. The perception data may include information relating to one or more objects in the environment of the AV 102a. For example, the on-board computing device 113 may process sensor data (e.g., LiDAR or RADAR data, camera images, etc.) in order to identify objects and/or features in the environment of AV 102a. The objects may include traffic signals, road way boundaries, other vehicles, pedestrians, and/or obstacles, etc. The on-board computing device 113 may use known object recognition algorithms, video tracking algorithms, and computer vision algorithms (e.g., track objects frame-to-frame iteratively over a number of time periods) to determine the perception.

It is also contemplated, the on-board computing device 113 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 113 may perform one or more prediction and/or forecasting operations. For example, the on-board computing device 113 may predict future locations, trajectories, and/or actions of one or more objects. For example, the on-board computing device 113 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the AV 102a, the surrounding environment, and/or their relationship(s). For example, if an object is a vehicle and the current driving environment includes an intersection, the on-board computing device 113 may predict whether the object will likely move straight forward or make a turn. If the perception data indicates that the intersection has no traffic light, the on-board computing device 113 may also predict whether the vehicle may have to fully stop prior to entering the intersection.

Figure 2:
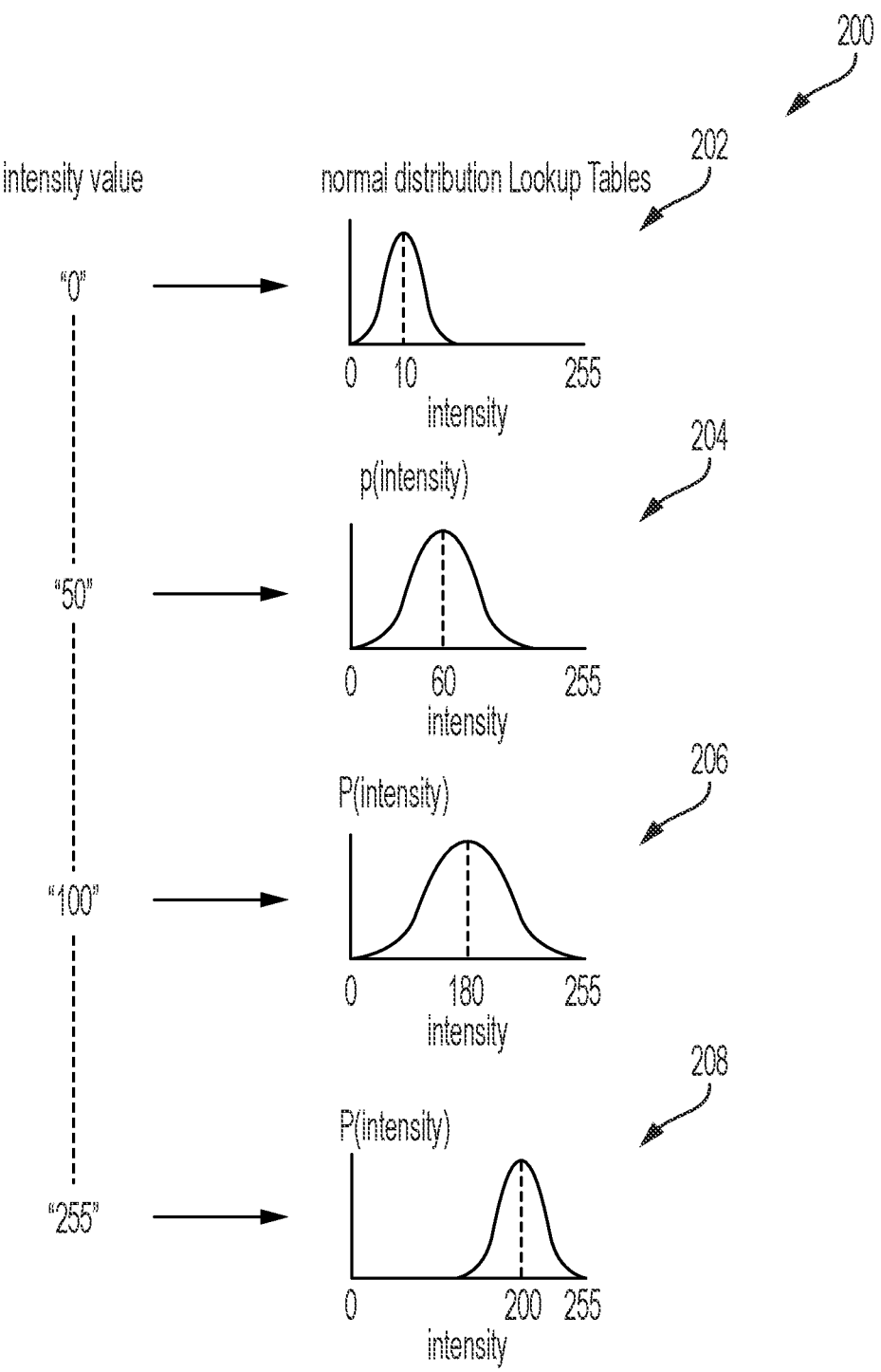
FIG. 2 illustrates an exemplary set of normal distribution lookup tables associated with intensity values acquired by images generated from a LIDAR system coupled to an autonomous vehicle.

FIG. 2 illustrates an exemplary graph set 200 demonstrating a set of normal distribution lookup tables 202-208 ("LUT") which may be generated from a corresponding online intensity value. For instance, LUT 202 may be a normal distribution for pixel having an intensity value "0" within a rasterized image which the computing device 113 may calculate from data acquired by the LIDAR system 113 (i.e., online map). Similarly, LUTs 204-208 may be the normal distributions for pixels having intensity values of "50," "100," and "255" within rasterized images which the computing device 113 may calculate from data acquired by the LIDAR system 113.

As explained further below, LUTs 202-208 may be used to correlate and calibrate an online map image to a previously acquired offline map image. It is also contemplated, however, LUTs 202-208 may be normal distributions generated from intensity values corresponding to pixels from a previously acquired and stored rasterized image (i.e., offline map). When LUTs 202-208 are generated from stored rasterized images (offline maps), computing device 113 may use LUTs 202-208 to calibrate the online map to the offline map.

The exemplary graph set 200 illustrate how a normal distribution LUT may be generated, calibrated, and/or updated. It is contemplated LUTs 202-208 may be generated within vehicle 102a as opposed to a remote computing device (e.g., device 110). Or LUTs 202-208 may be generated remotely and transmitted to vehicle 102a and stored within memory for use by computing device 113. For instance, each LUT (e.g., LUT 202-208) may be generated at remote computing device 110 and transmitted to vehicle 102a via network 108. The exemplary graph set 200 may be demonstrative of vehicle 102a generating and/or updating the LUT for detection of roadway lane markers (i.e., lines). For instance, the exemplary graph set 200 may be used to generate and/or update whether a roadway lane marker has changed, added, or removed since the original calibrated offline map was created.

As also illustrated the intensity values (i.e., intensity values "0," "50," "100," "255") of a given pixel value within either the online map or offline map may vary between 0-255. However, the intensity values may vary depending on the LIDAR system 118 or particular sensor used. For example, an intensity value of "100" may correspond to the distribution of LUT 206. The corresponding normal distribution LUT 206 may have a lower range (e.g., around 60), a mean value (e.g., 120), and an upper value (e.g., 180). However, the lower, mean, and upper values are merely exemplary and may vary depending up on stored calibration values, the type of sensor being used, the make/model of vehicle, or application.

Again, each intensity value may be generated based on data acquired from LIDAR system 118 within the vehicle 102a. These intensity values from the online map may then be compared to corresponding intensities in the offline map using the calibrated normal distributions. The normal distribution may be generated to include 3 parameters that are updated incrementally. For instance, the parameters may be mean, scaled variance (e.g., variance=scaled_variance/count) or count (e.g., number of intensity values used to generate this distribution). A normal distribution LUT (e.g., LUTs 202-208) may have a size of 256×3 to represent the intensity range and the number of parameters for the normal distribution.

It is contemplated the online intensity values may be collected as 102a is operating. For instance, the intensity values may be measurements of data acquired by LIDAR system 118 while vehicle 102a is driving (i.e., operating). During operation the vehicle 102a may collect intensity measurements and correspondences may be assessed by computing device 113 by projecting the intensity value measurements within an online map to an offline map with a common reference frame using the localization information.

Again, it is contemplated intensity value measurements (e.g., "100" within FIG. 2) may be calculated by computing device 113 based on a rasterized image generated from data acquired by LIDAR system 118 (i.e., online map). In turn, the computing device 113 may determine an intensity value for a corresponding pixel within a stored rasterized image (i.e., offline map). The "offline" intensity value may be compared to the normal distribution LUT 206 corresponding to the "online" intensity value. The disclosed system and method may compare the relations between the online and offline measurements. The relations may be determined by making use of the known correspondences using the localization information.

Figure 3:
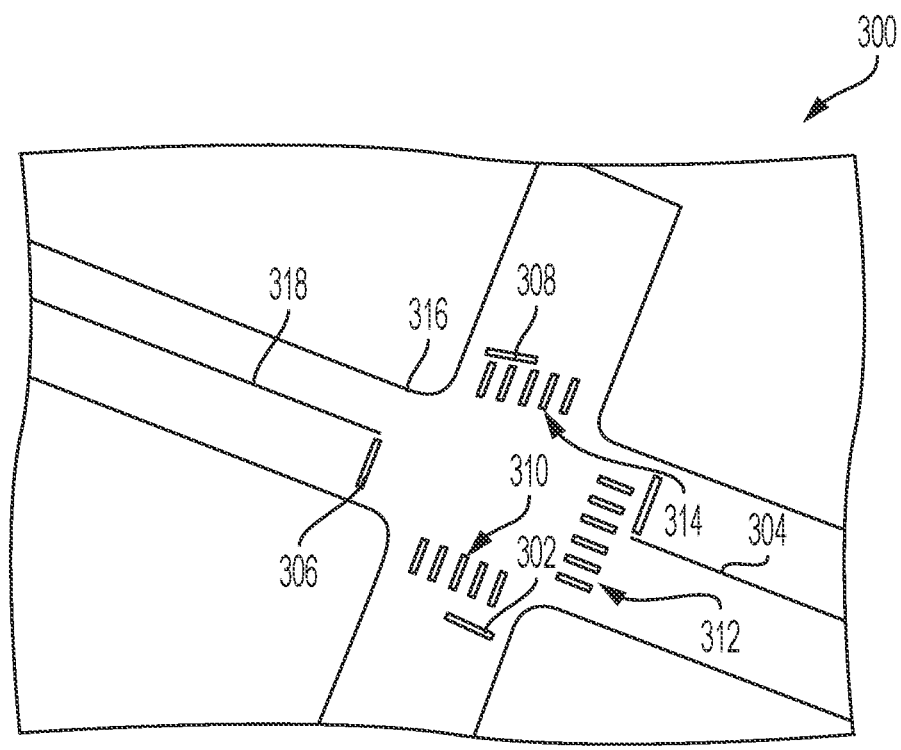
FIG. 3 illustrates an exemplary online mapping file generated from the LIDAR system coupled to the autonomous vehicle.

FIG. 3 illustrates an online map 300 (i.e., rasterized image) that may be generated by vehicle 102a based on data acquired from LIDAR system 118. As shown, the online map 300 may include one or more roadway markings 302-316 which may indicate a stop line, crosswalk, lane marking, or curb. When processed by computing device 113, the pixels indicative of the roadway markings 302-316 may generate intensity values higher than the corresponding road surface, sidewalks, embankments, or grass.

Figure 4:
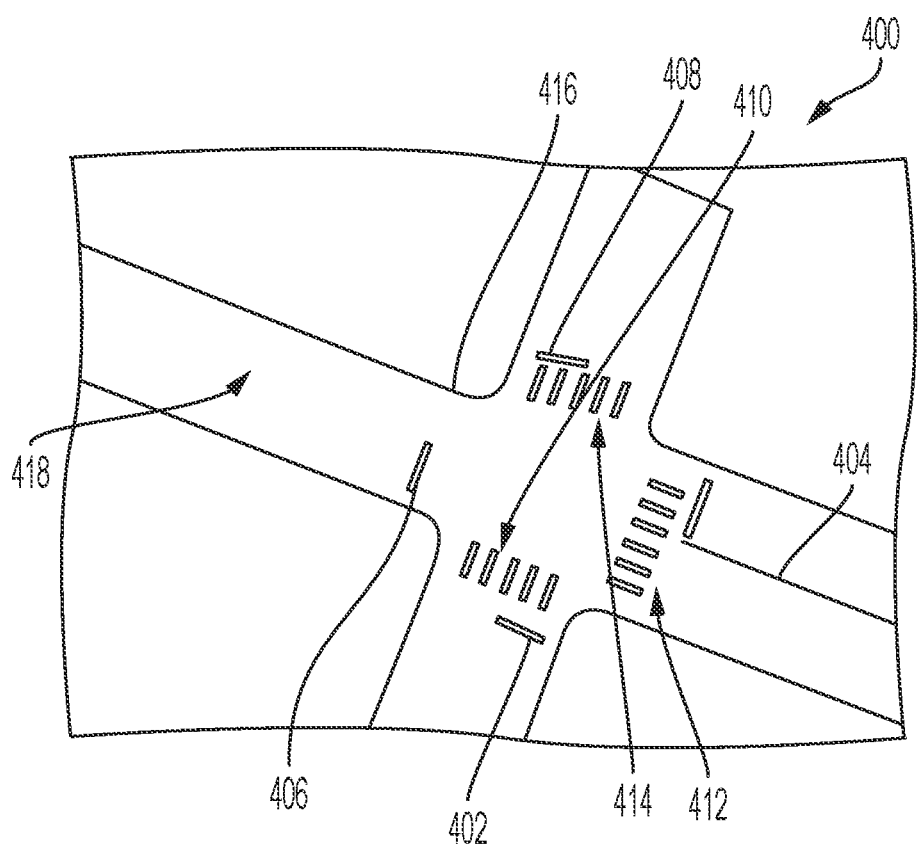
FIG. 4 illustrates an exemplary offline mapping file generated from a remote LIDAR system.

FIG. 4 illustrates an offline intensity map 400 (rasterized image) for the same intersection illustrated by FIG. 3. The offline map may be acquired using different sensors with another vehicle which traveled past the same intersection. It is contemplated the offline map 400 may be stored at a remote server (e.g., remote computing device 110) where processing of the image may occur to identify various road markings like lane markings, curbs, stop sign intersections, etc. The offline map 400 may then be transmitted to vehicle 102a and used by the computing device 113 in comparison with the online map 300 within object recognition algorithms, video tracking algorithms, and computer vision algorithms to determine the perception. The offline map 400 may be transmitted to vehicle 102a from a remote computing device (e.g., computing device 110) using network 108. Alternatively, the offline map 400 may be transmitted to vehicle 102a using an external wired connection (e.g., ethernet) or external dongle (e.g., USB flash drive).

As illustrated, the offline map 400 may likewise include one or more roadway markings 402-416 which may correspond to the stop line, crosswalk, lane marking, or curb illustrated in FIG. 3. A given roadway marking (e.g., marking 402) in the offline map 400 may also include an intensity measurement value similar to the intensity measurement value for the corresponding roadway marking (e.g., marking 302) within the online map 300. However, as further illustrated a given roadway marking 318 within the online map 300 may not exist within the offline map 400 (as indicated by area 418). The roadway marking 318 may have been added, removed, modified, or changed since the offline map 400 was generated. For instance, the offline map 400 illustrated in FIG. 4 may have been generated days, months, or longer to when vehicle 102a travels along the same intersection and generates the online map 300 illustrated by FIG. 3. When generated the online map 400 may include roadway marking 318, but the offline map 400 may not include the roadway marking (again as indicated by area 418).

Such differences may occur if a road marking (e.g., lane marking) has been removed or modified (e.g., due to construction or simply changed). When the offline map 400 is acquired construction may have been occurring and road marking 418 designating a given lane may have been modified or removed. However, when vehicle 102a is traversing down the same roadway at a later date, construction may no longer be occurring, and the road marking 318 detected in the online map 300 may now exist indicating a lane for vehicle 102a to travel within and a separate lane for oncoming traffic. While the reverse situation may occur, it is also contemplated lane markings may also simply be modified or removed.

Computing device 113 (based on data received from LIDAR system 118 and sensor system 111) may detect new, altered, or removed road markings within the online map 300 based on a high online intensity measurement of pixels within the rasterized image. But the corresponding offline map 400 may provide a different intensity measurement for the pixel corresponding to the same location within the offline rasterized image. The differences in the intensity measurements between the online map 300 and offline map 400 may degrade the quality of the calibration distributions. However, it is contemplated the intensity measurements between online and offline maps may differ even if no road marking changes exist. The present disclosure therefore contemplates capturing the varying range of values as normal distribution to identify intensities between the online and offline maps which may exceed a predefined threshold (i.e., indicating significant difference between the two maps) due to road marking changes.

It is therefore contemplated to simultaneously calibrate the intensities between the online map 300 and offline map 400. The simultaneous calibration may detect road marking changes using a normal distribution LUT (e.g., LUT 204). When an online intensity measurement is observed, the disclosed system and method may retrieve the corresponding normal distribution that was detected with a high probability of belonging to the corresponding normal distribution may then be added.

Computing device 113 may then update the normal distribution parameters. If the measurement is detected as having a low probability value, computing device 113 may not add the detected measurements to the distribution. The detected measurements may not be added to the distribution because there may exist a road marking change between the online map 300 and the offline map 400. Computing device 113 may further calculate whether the detected measurement in the online map 300 (or within the offline map 400) is due to a new or degraded road marking.

Figure 5:
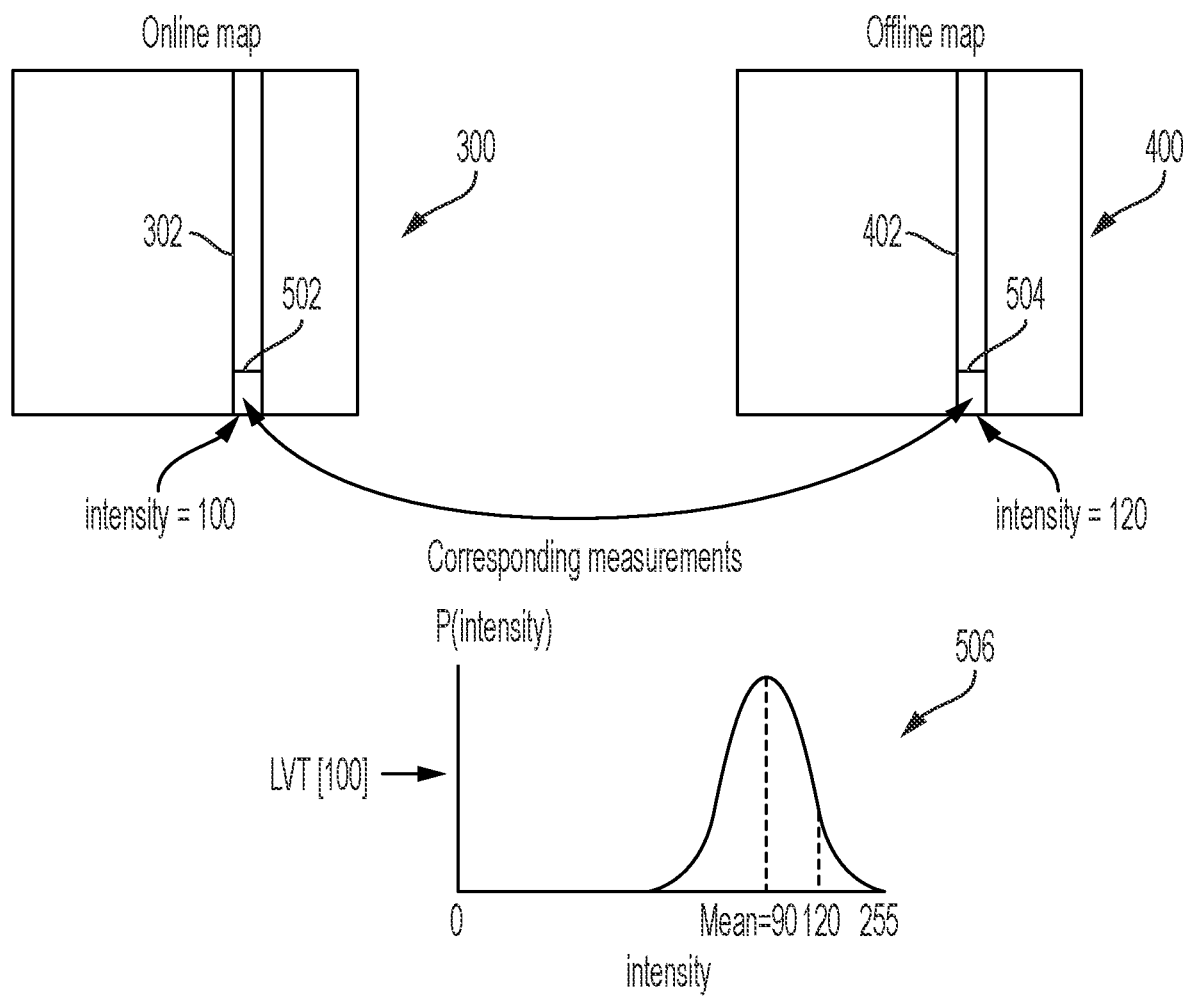
FIG. 5 illustrates an exemplary diagram of correlating the intensity values between an online mapping file and offline mapping file.

For instance, FIG. 5 illustrates an example where computing device 113 may detect no road marking change between the online map 300 and offline map 400. As shown, computing device 113 may detect road marking 302 within the online map 300 shown in FIG. 3. Computing device may likewise determine the offline map 400 includes a corresponding road marking 402 within the offline map 400. The computing device 113 may determine the lane marking 302 within the online map 300 may include a pixel 502 having an intensity measurement that is 100. The computing device 113 may evaluate pixel 504 to determine the intensity measurement of lane marking 402 within offline map 400. As illustrated the intensity measurement of lane marking 402 may be determined as being 120.

Computing device 113 may use the online measurement value of 100 to retrieve the normal distribution LUT 506 which may have a mean intensity value of 90. As illustrated, LUT 506 may be a bell-shaped curve function. Based on LUT 506, computing device 113 may determine the offline intensity measurement 504 (i.e., value of 120) is located within the normal distribution. Computing device may therefore determine there is no road marking change between the online map 300 and offline map 400. Instead, computing device may update the calibration distribution (i.e., LUT 506) corresponding to intensity value 100 from the online map by adding intensity value 120 from the offline map to the distribution. Once the calibration distribution has been updated, it may be stored in memory for future use by computing device 113.

Figure 6:
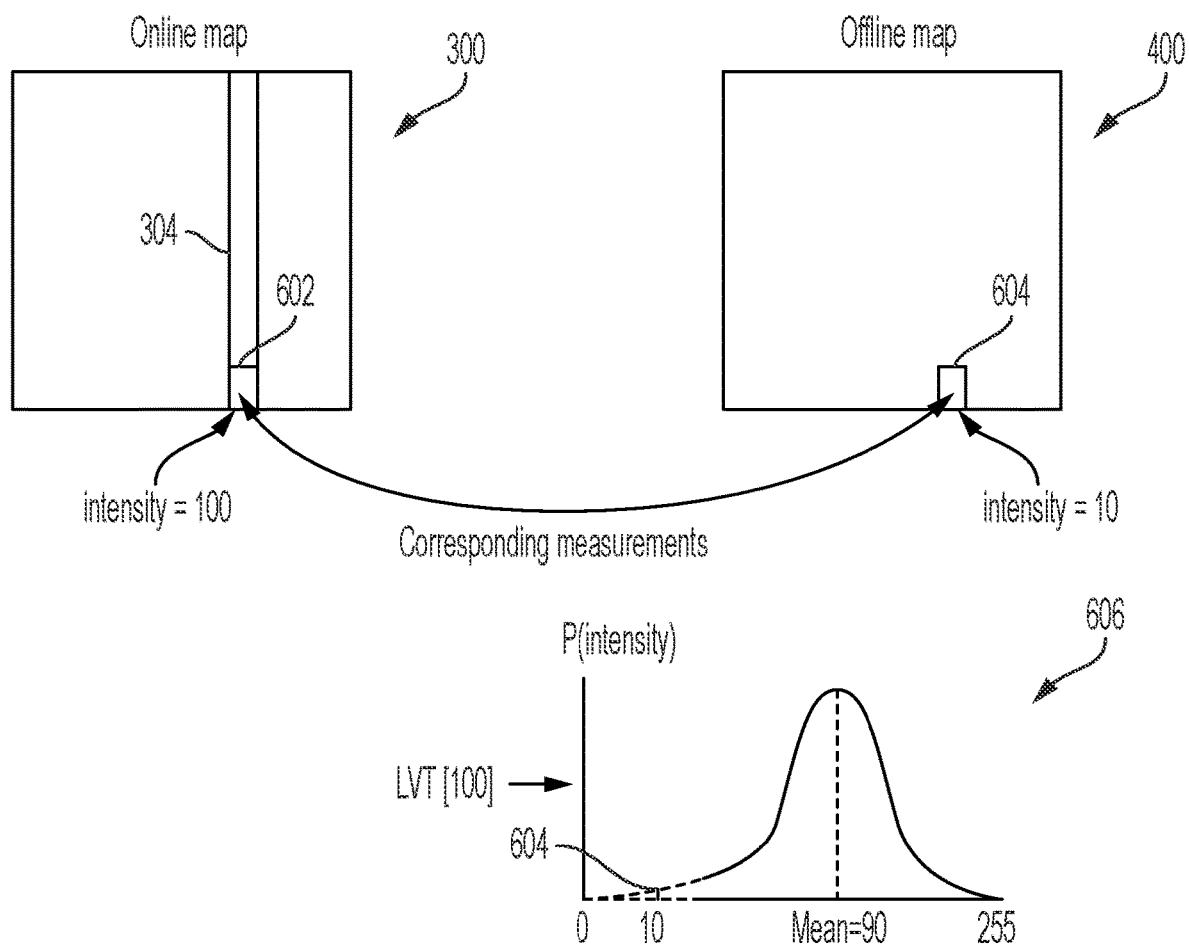
FIG. 6 illustrates an alternative exemplary diagram of correlating the intensity values between an online mapping file and offline mapping file.

FIG. 6 illustrates an alternative example illustrating a change in a road marking between the online map 300 and offline map 400. As shown, the computing device 113 may detect a road marking 318 having pixel 602 with an intensity value of 100. The computing device 113 may assess a pixel 604 within the corresponding offline map 400 for the same intersection. The computing device 113 may determine pixel 604 has an intensity value of 10. The difference between intensity of pixel 602 and pixel 604 may be due to a road marking change between the online map 300 and offline map 400. With reference to FIG. 3, lane marking 318 (which includes pixel 602) indicates a lane marking for the lane which vehicle 102a should be traveling within. FIG. 4, however, includes no road marking (as indicated by area 418) which would include pixel 604. Computing device 113 may acquire LUT 606 (corresponding to intensity value 100) which may have a mean of 90. As illustrated, pixel 604 with an intensity value of 10 would not fall within the normal distribution of LUT 606. The computing device 113 would therefore not determine that there is a corresponding measurement between the online map 300 and offline map 400.

Computing device 113 would then publish that a road marking change was detected between the online map 300 and offline map 400. For instance, computing device 113 may transmit to remote device 110 (via network 108) that a road marking change exists between the online map 300 and offline map 400. The remote computing device 110 may store the road marking change within database 112 and use the road marking change to update offline maps that may be transmitted to other vehicles connected to and having access to remote computing device 110. Or the road marking change may be downloaded to additional vehicles at a later time using a wired-connection or external dongle (e.g., USB drive).

Figure 7:
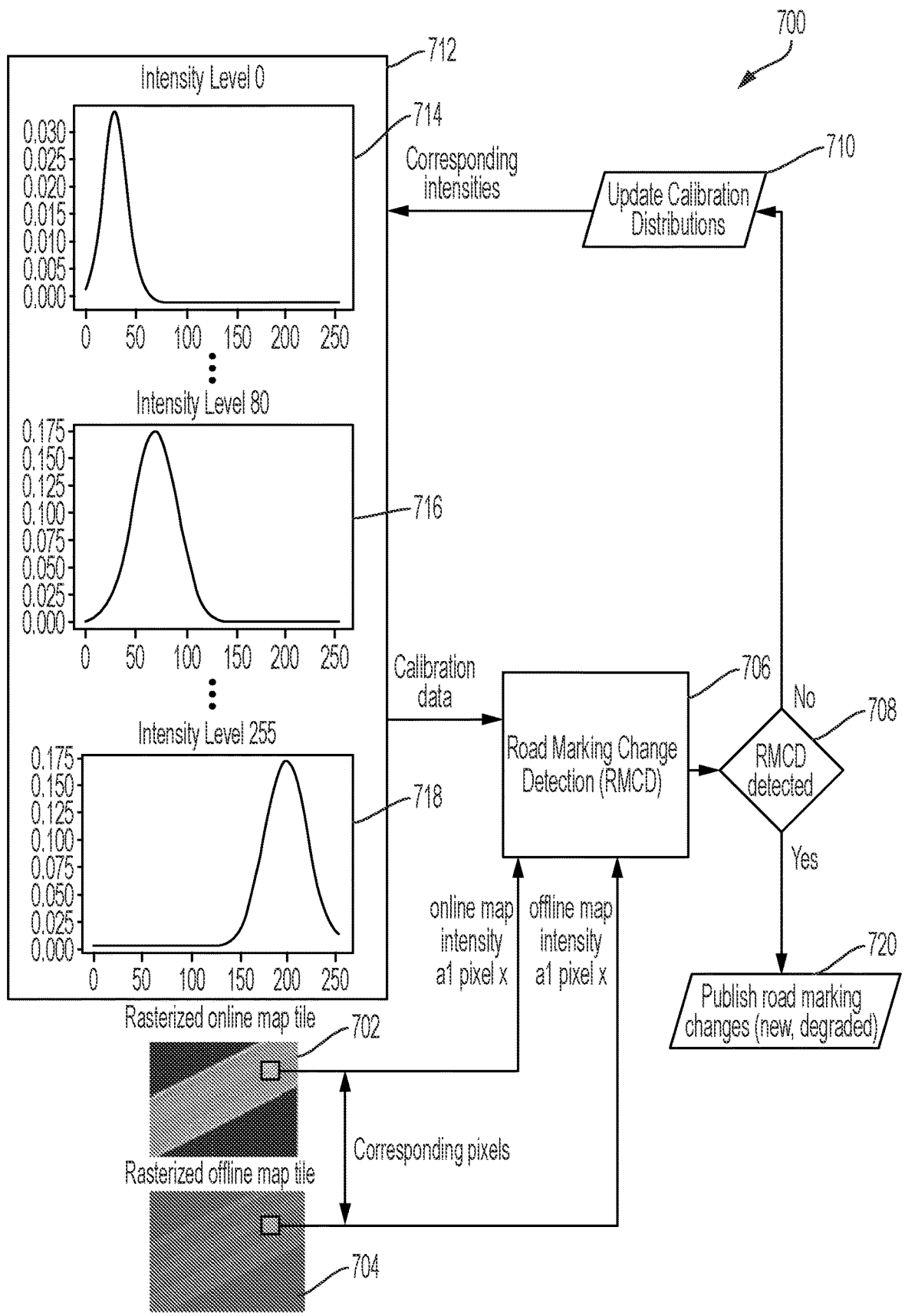
FIG. 7 illustrates an exemplary block diagram for determining when to update one or more calibration files or transmit roadway marking changes between an online mapping file and offline mapping file.

FIG. 7 is an exemplary block diagram 700 illustrating how vehicle 102a may detect road marking changes and/or calibrate the sensors of LIDAR system 118. At block 702, computing device 113 may evaluate one or more pixels (i.e., online pixels) within a rasterized image file based on sensed data from the LIDAR system 118 (i.e., online map). The online map illustrated at block 702 may be like online map 300 illustrated by FIG. 3 discussed above. Each pixel within the online map may be represented by an online intensity value. As discussed above, the online intensity values for online pixels representing lane markings (e.g., cross-walks, stop-line, lane markings, edge markings, center-line markings) may be greater than the online intensity values for asphalt or concrete road surface.

At block 704, computing device 113 may retrieve an offline intensity value for one or more pixels (i.e., offline pixels) from a stored rasterized image file (i.e., offline map). The selected offline pixel may correspond to the online pixel being selected from the online map. The offline map illustrated at block 704 may be like offline map 400 illustrated by FIG. 4 discussed above. Each offline pixel may also be represented by an offline intensity value. As discussed above, the offline intensity values for offline pixels representing lane markings (e.g., cross-walks, stop-line, lane markings, edge markings, center-line markings) may be greater than the offline intensity values for asphalt or concrete road surface.

At block 706, computing device 113 may operably include a road marking change detection (RMCD) algorithm that compares at least one online intensity value with a corresponding offline intensity value. For instance, as discussed with regards to FIG. 5 above, computing device 110 may compare the online intensity value of "100" from online pixel 502 with the offline intensity value "120" from offline pixel 504. Computing device 113 may receive calibration data that includes at least one LUT (i.e., LUTs 714-718) corresponding to a given online intensity value. As shown by block 712, vehicle 102a may store one or more normal distribution LUTs 714-718 that may be like or include LUTs 202-208, LUT 506 or LUT 606. Again, it is contemplated vehicle 102a may store an LUT for each intensity value that may be included within a given rasterized image file. For instance, vehicle 102a may store 256 LUTs for intensity values that range from "0" representing a black pixel intensity value to "255" representing a white pixel intensity value. However, it is also contemplated the intensity values may be represented by three values (e.g., red, green, blue) for rasterized image files that are color images. Vehicle 102a may store the LUTs represented within block 712 in a memory unit associated with or accessible by computing device 113.

At block 708, the computing device 113 may determine if the output of the RMCD algorithm (block 706) indicates a road marking change is detected. For instance, as explained with regards to FIG. 6, a RMCD would be indicated as being detected because the offline intensity value of "10" would not fall within the normal distribution of LUT 606. Computing device 113 would therefore proceed to block 720 where it would transmit (i.e., publish) that a road marking change was detected. Computing device 113 may transmit a road marking being detected to a remote computing device 110 via network 108. The remote computing device 110 may then be configured to update the offline map with the updated road marking change. Remote computing device 110 may further be configured to transmit the updated offline map to any vehicle (including vehicle 102a) that is connected to remote computing device 110.

If no road marking changes are detected at block 708, computing device 113 may proceed to block 710 to update the normal distribution for the calibration LUT. For instance, with reference to FIG. 5, computing device may determine that the offline intensity value "120" as represented by pixel 504 is included within the normal distribution of LUT 506. The offline intensity value "120" may be used to adjust or update the normal distribution of LUT 506. Once adjusted, computing device 113 may store the updated LUT 506 within memory (i.e., block 712). The updated LUT 506 may replace the previously stored LUT and may be used as calibration data for LIDAR system 118.

Figure 8:
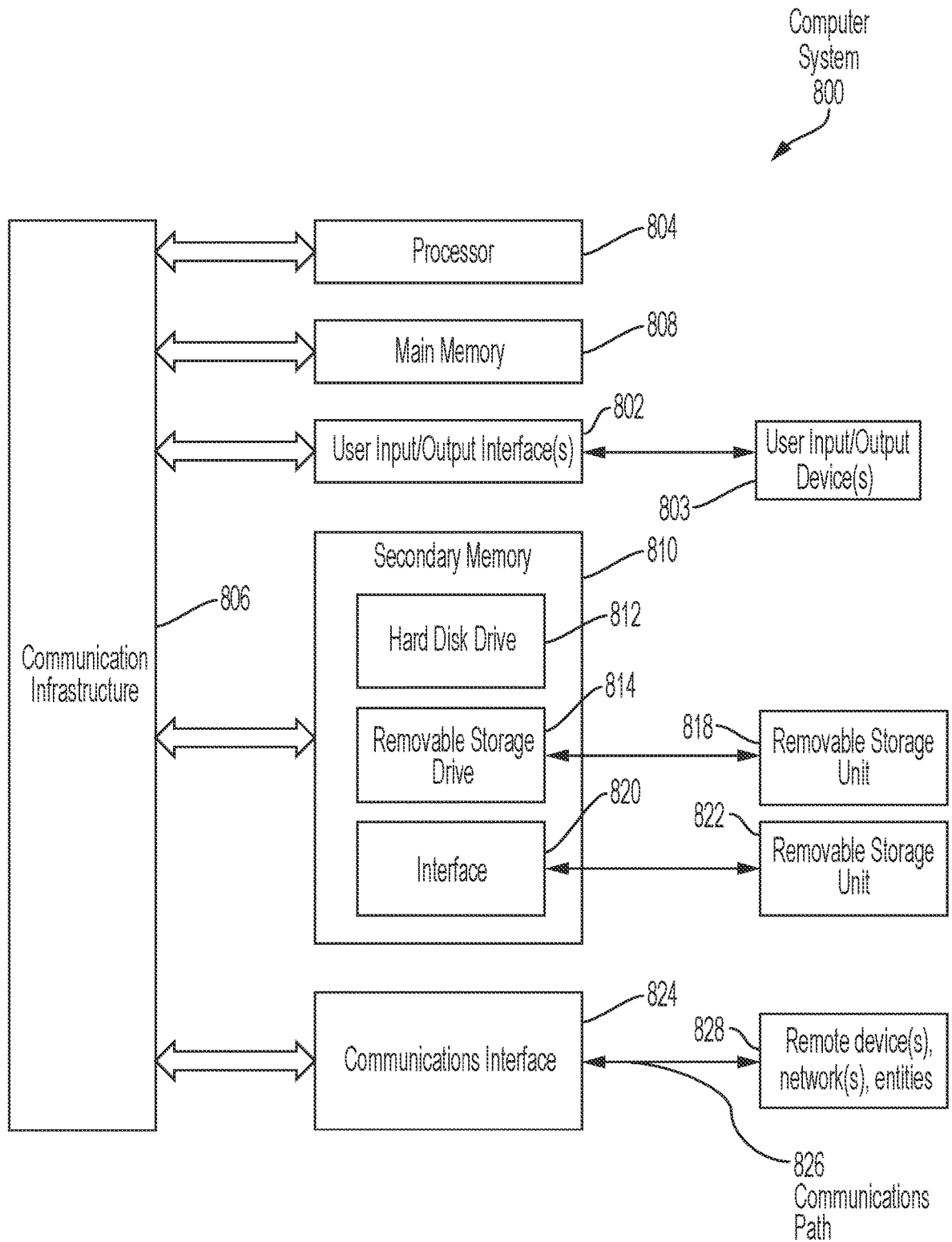
FIG. 8 illustrates an exemplary computer system which may be used for implementing various embodiments.

It is contemplated various embodiments discussed above can be implemented, for example, using one or more computer systems, such as computer system 800 shown in FIG. 8. Computer system 800 can be any computer capable of performing the functions described herein. For instance, computer system 800 can be any well-known computer capable of performing the functions described herein.

Computer system 800 may include one or more processors (also called central processing units, or CPUs), such as a processor 804. Processor 804 is connected to a communication infrastructure or bus 806. One or more processors 804 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 800 may also include user input/output device(s) 803, such as monitors, keyboards, pointing devices, etc., that communicate with communication infrastructure X06 through user input/output interface(s) 802.

Computer system 800 also includes a main or primary memory 808, such as random access memory (RAM). Main memory 808 may include one or more levels of cache. Main memory 808 has stored therein control logic (i.e., computer software) and/or data.

Computer system 800 may also include one or more secondary storage devices or memory 810. Secondary memory 810 may include, for example, a hard disk drive 812 and/or a removable storage device or drive 814. Removable storage drive 814 may be a floppy disk drive, a magnetic tape drive, a compact disk drive, an optical storage device, tape backup device, and/or any other storage device/drive.

Removable storage drive 814 may interact with a removable storage unit 818. Removable storage unit 818 includes a computer usable or readable storage device having stored thereon computer software (control logic) and/or data. Removable storage unit 818 may be a floppy disk, magnetic tape, compact disk, DVD, optical storage disk, and/any other computer data storage device. Removable storage drive 814 reads from and/or writes to removable storage unit 818 in a well-known manner.

According to an exemplary embodiment, secondary memory 810 may include other means, instrumentalities or other approaches for allowing computer programs and/or other instructions and/or data to be accessed by computer system 800. Such means, instrumentalities or other approaches may include, for example, a removable storage unit 822 and an interface 820. Examples of the removable storage unit 822 and the interface 820 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 800 may further include a communication or network interface 824. Communication interface 824 enables computer system 800 to communicate and interact with any combination of remote devices, remote networks, remote entities, etc. (individually and collectively referenced by reference number 828). For example, communication interface 824 may allow computer system 800 to communicate with remote devices 828 over communications path 826, which may be wired and/or wireless, and which may include any combination of LANs, WANs, the Internet, etc. Control logic and/or data may be transmitted to and from computer system 800 via communication path 826.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 800, main memory 808, secondary memory 810, and removable storage units 818 and 822, as well as tangible articles of manufacture embodying any combination of the foregoing. Such control logic, when executed by one or more data processing devices (such as computer system 800), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 8. In particular, embodiments can operate with software, hardware, and/or operating system implementations other than those described herein.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable mediums having computer readable program code embodied thereon.

Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method for calibrating data used by a sensor system within an autonomous vehicle, comprising:
receiving an online mapping file that includes a plurality of online intensity values indicative of online roadway markings, the online mapping file being generated from a first set of data acquired by a LIDAR sensor coupled to the autonomous vehicle, and wherein the online mapping file is generated based on a path being driven by the autonomous vehicle;
receiving an offline mapping file that includes a plurality of offline intensity values corresponding to offline roadway markings of the path being driven by the autonomous vehicle, wherein the offline mapping file is generated using a second set of data acquired from at least a second LIDAR sensor;
retrieving a lookup table using one of the plurality of online intensity values, wherein the lookup table is a normal distribution having a mean value different from the one of the plurality of online intensity values;
comparing one of the plurality of offline intensity values with the mean value of the normal distribution to determine whether the one of the plurality of offline intensity values is within the normal distribution; and
updating the normal distribution for the lookup table when the one of the plurality of offline intensity values is within the normal distribution.

2. The method of claim 1, wherein the online roadway marking is detected when the one of the plurality of online intensity values exceeds a predetermined threshold.

3. The method of claim 1, further comprising:
controlling operation of the autonomous vehicle based on the online roadway markings.

4. The method of claim 1, wherein the one of the plurality of offline intensity values representative of the offline roadway marking is different than the one of the plurality of online intensity values representative of the online roadway marking.

5. The method of claim 4, further comprising:
publishing, to a remote device, the online roadway marking is different than the offline roadway marking when the one of the plurality of offline intensity values is outside the normal distribution.

6. The method of claim 1, wherein the online mapping file is a rasterized data file.

7. The method of claim 6, wherein the rasterized data file is a gray-scale data file.

8. The method of claim 1, wherein the offline mapping file is received from remote computing device.

9. A system for calibrating data used by a sensor system within an autonomous vehicle, comprising:
a LIDAR sensor configured coupled to the autonomous vehicle, the LIDAR sensor configured to acquire a first set of data used to generate an online mapping file that includes a plurality of online intensity values indicative of online roadway markings, wherein the online mapping file is generated based on a path being driven by the autonomous vehicle;
a controller configured to:
receive the online mapping file;
receive an offline mapping file that includes a plurality of offline intensity values corresponding to offline roadway marking of the path being driven by the autonomous vehicle, wherein the offline mapping file is generated using a second set of data acquired from at least a second LIDAR sensor;
retrieve at least one lookup table using one of the plurality of online intensity values, wherein the one lookup table is a normal distribution having a mean value different from the one of the plurality of online intensity values; and
update the normal distribution for the at least one lookup table when at least one of the plurality of offline intensity values is within the normal distribution.

10. The system of claim 9, wherein the online roadway marking is detected when at least one of the plurality of online intensity values exceeds a predetermined threshold.

11. The system of claim 9, wherein the controller is further configured to control operation of the autonomous vehicle based on the online roadway markings.

12. The system of claim 9, wherein the one of the plurality of offline intensity values representative of the offline roadway marking is different than the at least one of the plurality of online intensity values representative of the online roadway marking.

13. The system of claim 12, wherein the controller is further configured to publish, to a remote device, the online roadway marking is different than the offline roadway marking when the at least one of the plurality of offline intensity values is outside the normal distribution.

14. A non-transitory computer-readable medium having instructions stored thereon that, when executed by at least one computing device, cause the at least one computing device to perform operations comprising:
receiving an online mapping file that includes a plurality of online intensity values indicative of online roadway markings, the online mapping file being generated from a first set of data acquired by a LIDAR sensor coupled to an autonomous vehicle, and wherein the online mapping file is generated based on a path being driven by the autonomous vehicle;
receiving an offline mapping file that includes a plurality of offline intensity values corresponding to offline roadway markings of the path being driven by the autonomous vehicle, wherein the offline mapping file is generated using a second set of data acquired from at least a second LIDAR sensor;
retrieving one lookup table using one of the plurality of online intensity values, wherein the one lookup table is a normal distribution having a mean value different from the one of the plurality of online intensity values; and
updating the normal distribution for the lookup table when the one of the plurality of offline intensity values is within the normal distribution.

15. The non-transitory computer-readable medium of claim 14, further comprising: detecting an online roadway marking along the path being driven by the autonomous vehicle using the online mapping file, wherein the online roadway marking is detected when the one of the plurality of online intensity values exceeds a predetermined threshold.

16. The non-transitory computer-readable medium of claim 15, further comprising: publishing, to a remote device, the online roadway marking is different than the offline roadway marking when the one of the at least one of the plurality of offline intensity values is outside the normal distribution, and wherein the one of the plurality of offline intensity values representative of the offline roadway marking is different than the one of the plurality of online intensity values representative of the online roadway marking.

* * * * *